United States Patent [19]

Light

[11] Patent Number: 4,891,569

[45] Date of Patent: Jan. 2, 1990

[54] POWER FACTOR CONTROLLER

[75] Inventor: David P. Light, Howell, Mich.

[73] Assignee: Versatex Industries, Brighton, Mich.

[21] Appl. No.: 409,930

[22] Filed: Aug. 20, 1982

[51] Int. Cl.[4] .............................................. G05F 1/70
[52] U.S. Cl. .................................. 323/210; 323/211
[58] Field of Search .............................. 323/209–211; 364/483

[56] References Cited

U.S. PATENT DOCUMENTS

| | | | |
|---|---|---|---|
| 3,787,729 | 1/1974 | Bennett | 307/41 |
| 4,055,795 | 10/1977 | Mathieu | 323/211 |
| 4,204,150 | 5/1980 | Mathieu | 323/211 |
| 4,317,076 | 2/1982 | Price | 323/210 |
| 4,353,024 | 10/1982 | Gyugyi | 323/211 |

FOREIGN PATENT DOCUMENTS

| | | | |
|---|---|---|---|
| 57-122 | 5/1981 | Japan | 323/211 |
| 548471 | 1/1977 | Switzerland | 323/209 |
| 2061641 | 5/1981 | United Kingdom | 364/483 |

Primary Examiner—William H. Beha, Jr.
Attorney, Agent, or Firm—Gifford, Groh, Sheridan, Sprinkle and Dolgorukov

[57] ABSTRACT

In a computer controlled power factor control system switches are activated and deactivated in a predetermined order so that each capacitor is electrically connected to the power distribution system for substantially the same total time throughout the life of the capacitors.

7 Claims, 2 Drawing Sheets

POWER FACTOR CONTROLLER

BACKGROUND OF THE INVENTION

I. Field of the Invention

The present invention relates to a power factor controller for use with an alternating current power distribution system.

II. Description of the Prior Art

In industrial applications, the electrical load requires not only kilowatts (KW) or working current but also kilovars (KVAR) which are drawn by motors and other inductive electrical equipment which require magnetizing current. The kilovar requirement increases proportionately with the inductive load and also proportionately increases the phase shift between the voltage and current components of the electrical power in the power distribution system.

The power factor for an alternating current power distribution system is equal to the cosine of the phase shift between the voltage and current signal components of the alternating electric power. The power factor is inversely proportional to the phase shift between the voltage in current and thus decreases as the phase shift increases.

A low power factor caused by high inductive electrical loads is disadvantageous in that it results in poor electrical efficiency. Consequently, a low power factor results in power losses in the individual motor feeders and in stepdown transformers. A low power factor also increases the resistive heat loss in transformers and other electrical distribution equipment and increases the difficulty of obtaining proper voltage stabilization. Perhaps more importantly, however, many electric utility companies impose penalties on industrial users when the power factor for the user falls below a prescribed amount. Consequently, a lower power factor ultimately results in increased electric utility bills.

In order to increase the power factor, it has been a previously known practice for industrial users to couple power capacitors in shunt with the inductive load since the capacitor reactance vector opposes the inductive reactance vector. Moreover, there have been several previously known power factor controllers which continually determine the power factor or phase shift between the voltage in current and progressively electrically connect capacitors from a bank of capacitors to the inductive load in order to increases the power factor. If the inductive load subsequently decreases, these previously known power factor controllers disconnect the capacitors from the inductive load in the reverse order, i.e., the last capacitor to be electrically connected to the load is first to be electrically disconnected and so on throughout the capacitor bank.

These previously known power factor controllers, however, have suffered from a number of disadvantages. One disadvantage of the previously known power factor controllers is that the on time for the individual capacitors, i.e., the duration of time that the capacitor is electrically connected with the inductive load, varies greatly from capacitor to capacitor. This occurs because the last capacitor to be electrically connected to the inductive load is the first to be electrically disconnected from the inductive load if the inductive load decreases and vice versa. Consequently, in a bank of N capacitors, the first capacitor in the bank in all likelihood will be electrically connected to the inductive load substantially constantly while the last capacitor in the capacitor bank is only occasionally, if ever, connected to the inductive load. Such uneven on time for the power capacitors disadvantageously results in an early failure for the capacitors at the beginning of the capacitor bank and also inefficient use of the capacitors at or near the end of the capacitor bank.

A still further disadvantage of these previously known power factor controllers is that they utilize a mechanical switching arrangement in order to electrically connect one disconnect the capacitors from the inductive load. Such mechanical switches, however, not only require periodic maintenance but are also prone to failure and thus necessitate replacement. Moreover, while the repair or replacement on the mechanical switches is performed, the power factor controller must be electrically disconnected from the inductive load for the obvious safety reasons.

A still further disadvantage of the previously known power factor controllers is that such power factor controllers attempt to obtain a unity power factor by selectively connecting and disconnecting capacitors to the inductive load. There is little reason, however, to maintain a power factor greater than the power factor below which the electrical utility charges a penalty. Typically, no penalty is assessed against the industrial user as long as the power factor remains above typically 0.8–0.9 and an attempt to maintain a unity power factor results in unnecessary use of the capacitors. Such capacitors, moreover, have a limited life and their unnecessary use results in their premature failure.

SUMMARY OF THE PRESENT INVENTION

The present invention provides an improved power factor controller which overcomes all of the above mentioned disadvantages of the previously known power factor controllers.

In brief, the power factor controller according to the present invention is adapted for use with an alternating current power distribution system having a voltage signal and a current signal. The power factor controller comprises a plurality of capacitors and a plurality of switches wherein one electrical switch is associated with each capacitor. Each switch is movable between an open and a closed position so that, in the closed position, the switch electrically connects its associated capacitor with the power distribution system. Conversely, with the switch in its open position, the switch electrically disconnects its associated capacitor from the power distribution system. Preferably the capacitor switches are electronic switches.

The power factor controller further comprises a phase detector which determines the magnitude of the phase shift, if any, between the voltage signal and current signal and also the direction of the phase shift, i.e., whether the voltage leads or lags the current signal. The phase detector then generates output signals representative of the magnitude and direction of the phase shift.

The outputs from the phase detector are fed as input signals to a microprocessor which is programmed to calculate the average power factor over a predetermined time, such as one minute. The microprocessor is further programmed to compare the calculated average power factor with a predetermined desired power factor that is adjustably preset by the user. Preferably, the predetermined power factor is set by means of binary encoded switches which are also fed as input signals to the microprocessor.

Following the comparison of the calculated power factor and the desired power factor, the microprocessor generates an output signal through a port to selectively actuate or deactuate the electrical switches to respectively increase or decrease the capacitive load on the power distribution system.

A primary feature of the power factor controller according to the present invention is that the capacitors are electrically connected and disconnected from the power distribution system in the same sequential and closed loop order. This ensures that substantially all of the capacitors are electrically connected to the power distribution system for substantially the same period of time throughout the operation of the power factor controller. Consequently, the sequential activation and deactivation of the capacitor switches prevents premature failure of the capacitors in the power factor controller.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
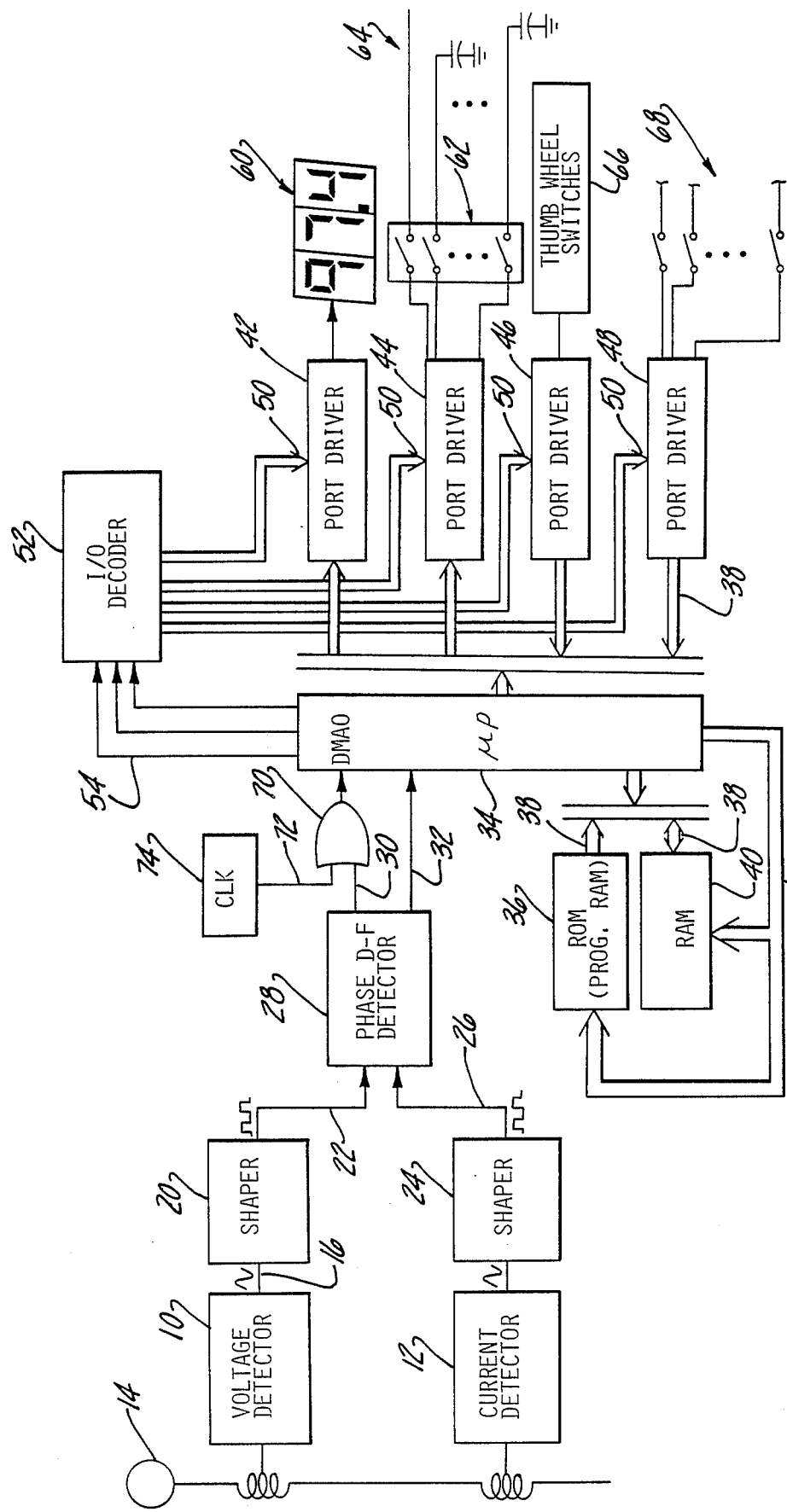
FIG. 1 is a block view illustrating the preferred embodiment of the power factor controller of the present invention.

With reference first to FIG. 1, a block diagrammatic view of a preferred embodiment of the power factor controller of the present invention is thereshown and comprises a voltage detector 10 and a current detector 12 (such as ICL 7641 comparators). Both the voltage detector 10 and current detector 12 are electrically connected with an alternating current electrical power distribution system 14 by conventional means.

The voltage detector generates a sinusoidal wave signal at its output 16 which is substantially in phase with the voltage component of the power distribution system 14. Similarly, the current detector 12 generates a sinusoidal wave signal on its output 18 which is substantially in phase with the current component of the power distribution system. The phase difference between the signal on lines 16 and 18 is inversely proportional to the power factor of the electrical system 14.

The output 16 from the voltage detector 10 is fed as an input signal to a wave shaping circuit 20 (such as an LM 239 differential amplifier) which transforms the sinusoidal wave input to an in phase square wave signal at its output 22. Similarly, a second wave shaping circuit 24 (such as an LM 239 differential amplifier) transforms the sinusoidal wave input from the current detector 12 into an in phase square wave signal at its output 26. Both wave shaping circuits 20 and 24 are of a conventional construction.

The outputs 22 and 26 from the wave shaping circuit 20 and 24 are connected as input signals to a phase detector 28 (such as a 4013 flip flop). The phase detector 28 generates a pulse signal on an output line 30 having a width equal to the phase difference between its two input signals and thus equal to the phase shift between the voltage and current components of the power distribution system 14. The phase detector 28 also generates a second signal on a LEAD/LAG output 32 which is representative of whether the current signal leads or lags the voltage signal of the power distribution system 14.

In the preferred form of the invention, a microprocessor (such as an RCA CDP 1802) controls the operation of the power factor controller in a manner which will subsequently be described in greater detail. A computer program contained in a memory 36 (such as an EPROM 2716), such as read only members (ROM), is electrically connected to the microprocessor 34 by a data buss 38 and address buss 40. In the well known fashion, the program memory 36 contains a sequence of instructions which control the operation of the microprocessor 24. In addition, random access memory 40 (such as an RCA CDP 1824) is also connected to the microprocessor 34 by the address buss 41 and data buss 38. Although the program memory 36 and random access memory 40 are illustrated in FIG. 1 as being separate from the microprocessor 34, it will be understood that alternatively, both memories 36 and 40 can be self-contained on the integrated circuit for the microprocessor 34.

The microprocessor data buss 38 is also connected to four port drivers 42, 44, 46 and 48 (such as an RCA CDP 1852). Each port driver 42-48 includes a select input 50 so that each port driver 42-48 is active only when its select input 50 is at a predetermined binary level. An I/O decoder 52 is electrically connected to the select input 50 of the port drivers 42-48 and receives input signals on lines 54 from the microprocessor 34. Consequently, the I/O decoder 52 (such as an RCA CDO 1867) generates output signals to selectively activate only one of the four port drivers 42-48 at a given time in dependence upon the signal from the microprocessor lines 54.

The first port driver 42 controls the output to a digital display 60 which can be of any conventional construction, such as a LED or LCD display. The display (such as an MAN 6730) 60 is used to indicate, under microprocessor control, the power factor of the electrical system 14.

The second port driver 44 selectively controls the activation of a plurality of electronic switches 62. Each switch 62 is preferably a solid state relay. Each switch 62 is electrically connected with a capacitor 64 which in turn is connected with the power distribution system 14. Activation of one switch 62 electrically connects is associated capacitor 64 with the power distribution system 14. Conversely, deactivation of one switch electrically disconnects its associated capacitor 64 from the power distribution system 14.

The fourth port driver 46 is electrically connected to binary encoded switches 64, such as binary encoded thumbwheel switches. The switches 64 are adjusted by the user and provides an input signal through the port driver 46 to the microprocessor 34 of the desired power factor for the electrical system 14.

The last port driver 48 is electrically conncted to selection switches 68 which provide input signals to the microprocessor 34 through the port driver 48 of the number of capacitors 64 which are available for activation. In some applications, it may be necessary for the power factor controller to have only a limited number of capacitors 64, such as two or three in order to obtain the desired power factor of the electrical system 14. Conversely, in other applications, and particularly applications with high inductive loads, it may be necessary to have more capacitors 64, for example, seven or eight capacitors 64, in order to achieve the desired power factor for the electrical system 14. The selection switches 68 thus enable the power factor controller of the present invention to be used throughout a wide range of different applications.

The LEAD/LAG signal 32 from phase detector 28 is also connected as an input signal to the microprocessor 34. In addition, the phase difference pulse on line 30 from the phase detector 28 is connected as one input to an AND gate 70 and the output of the AND gate 70 is connected as the input signal to the microprocessor 34. The other input 72 to the AND gate 70 is connected to a high frequency clock 74 so that the number of pulses on the output from the AND gate 70 is proportional to the phase shift, and thus the power factor, of the electrical system 14.

In the preferred form of the invention, the microprocessor 34 is an RCA 1802 microprocessor and the output from the AND gate 70 is connected to the DMA0 (Direct Memory Access) input. With DMA selected, each pulse on the DMA0 input line increments a register R(0) in the microprocessor 34. The R(0) register is used to increment a lookup table which contains the power factor conversions for a given number of output pulses from the AND gate 70. It will be understood, of course, that other microprocessors can alternatively be employed without deviation from the spirit or scope of the present invention.

Figure 2:
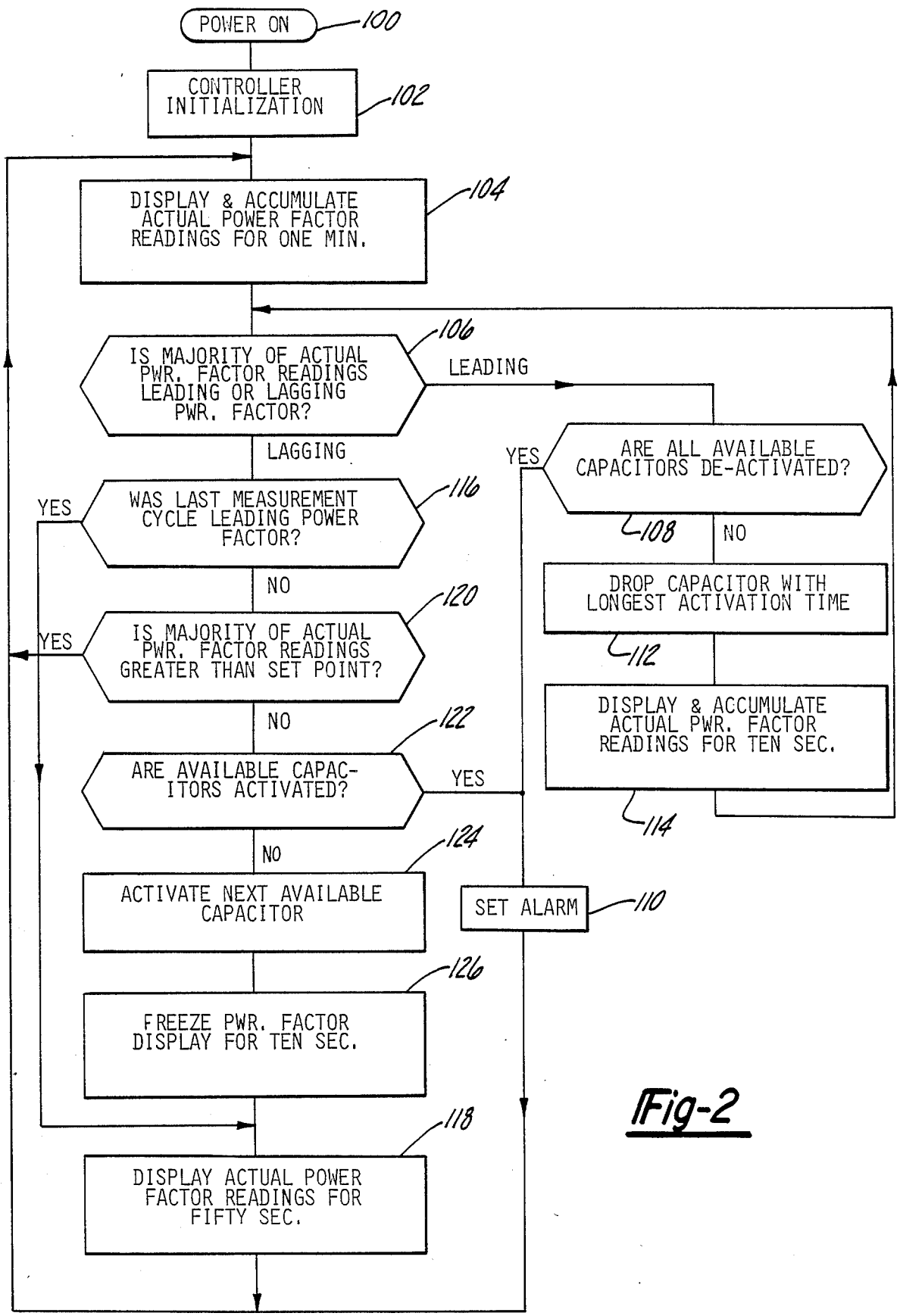
FIG. 2 is a flow chart illustrating the operation of the preferred embodiment of the power factor controllers.

With reference now to FIG. 2, the operation of the power factor controller will now be described. After power is supplied to the controller at step 100, the controller performs an initialization routine at step 102. The initialization routine determines the desired power factor from the binary encoded switches 66 and stores this value in the random access memory 40. Similarly, the switches 68 are read through the port driver 48 to determine the number of capacitors available for activation by the controller.

At step 104, the microprocessor determines the actual power factor readings over a period of time, for example, one minute, by reading the input from the AND gate 70 and LEAD/LAG signal 32. The determined power factor is also displayed by the microprocessor 34 on the display means 60.

At step 104, the microprocessor 34 determines whether the majority of power factor readings performed at step 104 indicate a leading power factor or a lagging power factor. Assuming that the power factor is leading, the program branches to step 108 to determine if all of the capacitors have been deactivated. If so, an alarm is set at step 110 and program control returns to step 104.

Assuming that capacitors remain activated, step 104 branches to step 112 in which the microprocessor 134 generates a signal to the capacitor switches 62 via a port 44 to deactivate the capacitor having the longest activation time. Step 114 displays and accumulates the power factor readings for a predetermined period of time, for example, 10 seconds after which program control is returned to step 106.

Assuming, on the other hand, that step 106 determines that the majority of power factor readings indicate a lagging power factor, step 116 first determines whether the last measurement cycle indicated a leading power factor. If so, the program branches to step 118 which measures and displays the actual power factor for a predetermined time, for example, 50 seconds and then returns the program control to step 104.

Assuming that the last measurement cycle indicated a lagging power factor, step 116 branches to step 120 which compares the actual or calculated power factor with the desired power factor as set by the binary encoded switches 66. If the actual power factor is greater than the desired power factor as set by the switches 66, the program control returns to step 104.

Conversely, if the actual power factor is less than the desired power factor, step 120 instead branches to step 122 which determines whether all of the available capacitors have been activated. If so, the alarm 10 is set and the program returns to step 104.

Assuming that there are additional capacitors 64 which have not yet been activated, step 122 branches to step 124 whereupon the microprocessor 34 generates a signal to the capacitor switches 62 via the port driver 44 to activate the next available capacitor, i.e., the capacitor which has been deactivated for the longest period of time. Step 124 then branches to step 126 in which the microprocessor generates a signal to the display means 66 via its port driver 42 to freeze the power factor for a short period of time, for example 10 seconds in order to enable the power factor to stabilize. Step 126 then branches through step 118 and to step 104 whereupon the above described process is again reiteratively repeated.

A primary advantage of the power factor controller of the present invention is that the capacitors 64 are activated and deactivated in the same sequence. Consequently, when a leading power factor is present on the power distribution system, step 112 drops or deactivates the capacitor with the longest activation time from the power distribution system 14. Similarly, if the event that the power factor is lagging and less than the desired set point as determined by the thumbwheel switches 66, step 124 activates the capacitor which has been deactivated for the longest period of time. For example, assuming that the controller has four capacitors 64, the capacitors 64 will be activated and deactivated in the following sequence: first capacitor, second capacitor, third capacitor, fourth capacitor, first capacitor, second capacitor, etc. Consequently, over a period of time, all of the capacitors 64 will be electrically connected to the system for substantially the same period of time.

It will be understood, however, that the microprocessor can be programmed in ways other than the sequential activation and deactivation of the capacitors and yet equalize the on time for the capacitors. For example, the microprocessor can be programmed to measure the total activation time of each capacitor and to selectively activate the capacitors having the shortest overall connection time and vice versa.

A still further advantage of the power factor controller of the present invention is that the user can both set the desired power factor by adjustment of the binary encoded switches 66 and also can set the switches 66 to indicate the factor controller. As such, the power factor controller of the present invention can be customized for use over a wide range of different applications.

Having described my invention, however, many modifications thereto will become apparent to those skilled in the art to which it pertains without deviation from the spirit of the invention as defined by the scope of the appended claims.

I claim:

1. For use in conjunction with an alternating current power distribution system having a voltage signal and a current signal, a power factor controller comprising:
   a plurality of capacitors, wherein the number of capacitors can be varied,
   means for generating a first signal representative of the number of said capacitors,
   switch means comprising a plurality of switches, one switch being electrically connected with each capacitor and operable, upon activation, to electrically connect its associated capacitor to the power distribution system, and operable, upon deactivation, to electrically disconnect its associated capacitor to the power distribution system,
   means for determining the direction and magnitude of a phase shift between the voltage signal and the current signal in the power distribution system and for generating a magnitude output signal and a LEAD/LAG representative thereof,
   means for comparing said magnitude output signal with a preset phase shift signal, and
   switch control means responsive to said first signal and to said comparing means for selectively activating one of said switches in said switch means to electrically connect the capacitor in said plurality of capacitors which has been disconnected from the power distribution system for the longest period of time when the magnitude output signal exceeds said preset signal and when said LEAD/LAG is in a first direction and for selectively deactivating one of said switches in said switch means to electrically disconnect the capacitor of said plurality of capacitors which has been electrically connected to said power distribution system for the longest period of time when either said preset signal exceeds said magnitude output signal or said LEAD/LAG signal is in the opposite direction.

2. The invention as defined in claim 1 wherein said switch control means electrically connect and disconnect said capacitors to said power distribution system in a prederermined sequential order.

3. The invention as defined in claim 1 wherein each switch is a solid state relay.

4. The invention as defined in claim 1 and further comprising a time delay means for deactivating said switch control means following the activation or deactivation of any switch.

5. The invention as defined in claim 1 and further comprising means for selectively adjusting said preset phase shift value.

6. The invention as defined in claim 5 wherein said adjustable means comprises at least one binary encoded switch.

7. The invention as defined in claim 1 and comprising means for diaplaying a value representative of the magnitude of said phase shift between said voltage and said current signals of said power distribution signal.

* * * * *